US011035079B2

(12) United States Patent
Rousseau et al.

(10) Patent No.: US 11,035,079 B2
(45) Date of Patent: Jun. 15, 2021

(54) VEGETABLE PAPER COMPRISING FIBRES OF A PLANT

(71) Applicants: Schweitzer-Mauduit International, Inc., Alpharetta, GA (US); SWM LUXEMBOURG SARL, Contern (LU)

(72) Inventors: Cédric Rousseau, Le Mans (FR); Laetitia Barat, Le Mans (FR)

(73) Assignee: Schweitzer-Mauduit International, Inc., Alpharetta, GA (US)

( * ) Notice: Subject to any disclaimer, the term of this patent is extended or adjusted under 35 U.S.C. 154(b) by 80 days.

(21) Appl. No.: 16/091,347

(22) PCT Filed: Apr. 5, 2017

(86) PCT No.: PCT/EP2017/058121
§ 371 (c)(1),
(2) Date: Oct. 4, 2018

(87) PCT Pub. No.: WO2017/174661
PCT Pub. Date: Oct. 12, 2017

(65) Prior Publication Data
US 2019/0145050 A1 May 16, 2019

(30) Foreign Application Priority Data
Apr. 5, 2016 (FR) ...................... 1652994

(51) Int. Cl.
*D21H 11/12* (2006.01)
*D21H 27/00* (2006.01)
*D21H 27/10* (2006.01)
*D21C 3/20* (2006.01)
*C11D 17/04* (2006.01)
*D21H 15/10* (2006.01)

(52) U.S. Cl.
CPC ........... *D21H 11/12* (2013.01); *C11D 17/049* (2013.01); *D21C 3/20* (2013.01); *D21H 15/10* (2013.01); *D21H 27/002* (2013.01); *D21H 27/10* (2013.01)

(58) Field of Classification Search
USPC ....................................................... 162/100
See application file for complete search history.

(56) References Cited

U.S. PATENT DOCUMENTS

| 3,353,541 A | 11/1967 | Hind et al. |
| 3,386,449 A | 6/1968 | Hind |
| 3,415,253 A | 12/1968 | Michels et al. |
| 3,420,421 A | 1/1969 | Hind et al. |
| 3,428,053 A | 2/1969 | Schoenbaum et al. |
| 3,467,109 A | 9/1969 | Block et al. |
| 3,483,874 A | 12/1969 | Hind |
| 3,561,451 A | 2/1971 | Jacin et al. |
| 3,760,815 A | 9/1973 | Deszyck |
| 3,840,024 A | 10/1974 | Nicholl |
| 3,847,164 A | 11/1974 | Mattina et al. |
| 3,860,012 A | 1/1975 | Selke |
| 4,182,349 A | 1/1980 | Selke |
| 4,674,519 A | 6/1987 | Keritsis et al. |
| 4,891,232 A | 1/1990 | Dahl |
| 5,099,862 A | 3/1992 | White et al. |
| 5,529,796 A | 6/1996 | Gobbo |
| 5,715,844 A | 2/1998 | Young et al. |
| 5,724,998 A | 3/1998 | Gellatly et al. |
| 5,765,570 A | 6/1998 | Litzinger et al. |
| 6,761,918 B2 | 7/2004 | Pulikkottil et al. |
| 6,818,234 B1 | 11/2004 | Nair et al. |
| 7,001,629 B1 | 2/2006 | Mengal et al. |
| 7,595,428 B2 | 9/2009 | Ueda |
| 7,793,585 B2 | 9/2010 | Rasmussen |
| 8,499,965 B2 | 8/2013 | Sheffield |
| 8,597,667 B2 | 12/2013 | Mou et al. |
| 8,734,881 B2 | 5/2014 | Yoakim et al. |
| 9,220,296 B2 | 12/2015 | Fall et al. |
| 2002/0132098 A1 | 9/2002 | Miyazawa et al. |
| 2003/0004479 A1 | 1/2003 | Ueda et al. |
| 2003/0113411 A1 | 6/2003 | Rose |
| 2003/0185956 A1 | 10/2003 | Gradley |
| 2003/0187055 A1 | 10/2003 | Riker |
| 2004/0156920 A1 | 8/2004 | Kane |
| 2004/0180077 A1 | 9/2004 | Riker |
| 2005/0064049 A1 | 3/2005 | Mori et al. |
| 2005/0088632 A1 | 4/2005 | Sadi |
| 2005/0158252 A1 | 7/2005 | Romanowski |
| 2005/0244516 A1 | 11/2005 | Mercati |
| 2006/0051464 A1 | 3/2006 | McHugh |
| 2006/0165756 A1 | 7/2006 | Catani |
| 2007/0048429 A1 | 3/2007 | Griffiths |
| 2007/0199453 A1 | 8/2007 | Ramussen |
| 2007/0243273 A1 | 10/2007 | Dev et al. |

(Continued)

FOREIGN PATENT DOCUMENTS

| CN | 1329855 A | 1/2002 |
| CN | 1351949 | 6/2002 |

(Continued)

OTHER PUBLICATIONS

Raventos et al., Application and Possibilities of Supercritical $CO_2$ Extraction in Food Processing Industry: An Overview, Food Science Tech. Int. (2002), vol. 8 (5) pp. 269-284.

(Continued)

*Primary Examiner* — Mark Halpern
(74) *Attorney, Agent, or Firm* — Dority & Manning, P.A.

(57) ABSTRACT

The invention relates to a vegetable paper comprising fibres of a plant that has undergone extraction in a solvent.

22 Claims, No Drawings

(56) References Cited

U.S. PATENT DOCUMENTS

| | | |
|---|---|---|
| 2009/0047328 A1 | 2/2009 | Cunningham |
| 2009/0169654 A1 | 7/2009 | Banerjee |
| 2010/0032444 A1 | 2/2010 | Sheffield |
| 2010/0196545 A1 | 8/2010 | Buffet |
| 2010/0210866 A1 | 8/2010 | Toyohara et al. |
| 2010/0233322 A1 | 9/2010 | Fukuda |
| 2011/0020512 A1 | 1/2011 | Masutake |
| 2011/0236502 A1 | 9/2011 | Guillory |
| 2012/0258206 A1 | 10/2012 | McHugh |
| 2013/0280320 A1 | 10/2013 | Mompon |
| 2014/0224265 A1 | 8/2014 | Rouillard et al. |
| 2014/0295049 A1 | 10/2014 | Ragot et al. |
| 2015/0037389 A1 | 2/2015 | Ragot et al. |
| 2015/0050371 A1 | 2/2015 | Gehling et al. |
| 2015/0056255 A1 | 2/2015 | Ragot et al. |
| 2015/0175810 A1 | 6/2015 | Rieland |
| 2015/0230491 A1 | 8/2015 | Looft |
| 2015/0374624 A1 | 12/2015 | Ragot et al. |
| 2016/0255854 A1 | 9/2016 | Rousseau |
| 2017/0174404 A1 | 6/2017 | Ragot et al. |
| 2017/0303576 A1 | 10/2017 | Rousseau |

FOREIGN PATENT DOCUMENTS

| | | |
|---|---|---|
| CN | 1565286 A | 1/2005 |
| CN | 1912245 | 2/2007 |
| CN | 1957777 A | 5/2007 |
| CN | 101349030 | 1/2009 |
| CN | 101363201 | 2/2009 |
| CN | 10155669 | 10/2009 |
| CN | 102919430 | 2/2012 |
| CN | 102943407 | 2/2013 |
| CN | 103054156 | 4/2013 |
| CN | 103422381 | 12/2013 |
| DE | 202010001912 U1 | 3/2011 |
| EP | 0645491 | 3/1995 |
| JP | H 09163930 | 6/1997 |
| JP | H10304822 | 11/1998 |
| JP | 2001131866 A | 5/2001 |
| JP | 2007098152 | 4/2004 |
| JP | 2005119967 | 5/2005 |
| JP | 2005306742 A | 11/2005 |
| JP | 2006050934 A | 2/2006 |
| JP | 2006246817 A | 9/2006 |
| JP | 2006249599 A | 9/2006 |
| JP | 2006256968 A | 9/2006 |
| JP | 0205655 | 11/2008 |
| JP | 20082744535 | 11/2008 |
| JP | 2011182783 | 9/2011 |
| KR | 20070090286 | 9/2007 |
| KR | 20100114348 | 10/2010 |
| WO | WO 93/15261 | 8/1993 |
| WO | WO9409653 | 5/1994 |
| WO | WO 96/41052 | 12/1996 |
| WO | WO 0205655 | 1/2002 |
| WO | WO 2015/144893 | 10/2015 |

OTHER PUBLICATIONS

Greer, C.C,. A Text-Book of Cooking; J.S. Cushing Co.-Berwick & Smith Co. Norwood, MA 1915, pp. 175-177.

Innovation Food Online, Sodium Alginate; URL<https://innovationinfood.wikispaces.com/Sodium+alginate> Published Jan. 4, 2007 Online, 7 pages with one extra page having google search hit with datestamp.

CN20090097787; Huimin, Y., dated Apr. 2009, English Abstract Only, 2 pages.

SU1161061; Choladze, et al., dated Jun. 1985,English Abstract Only, 2 pages.

CN102422941, Huang Hening, Abstract Only, dated Apr. 25, 2012 English Abstract, Only, 1 page.

Blumenthal et al., Herbal Medicine, Expanded Commission E. Monographs, 2000, pp. 393-400.

Adams et al., Analysis of the Interactions of Botanical Extract Combinations Against the Viability of Prostate Cancer Cell Lines, Mar. 2003, pp. 117-124.

Lin et al., Inhibition of Helicobacter Pylori and Associated Urease by Oregano and Cranberry Phytochemical Synergies, Applied and Environmental Microbiology, Dec. 2005, vol. 71., No. 12, pp. 8558-8564.

Du et al. Physical and Antibacterial Properties of Edible Films Formulated with Apple Skin Polyphenols. Journals of Food Science 2011, Retrieved from URL: https://onlinelibrary.wiley.com/doi/epdf/10.1111/j. 1750-3841.2010.02012.x>.

Du et al. Sensory Evaluation of Baked Chicken Wrapped with Antimicrobial Apple and Tomato Edible Films Formulated with Cinnamaldehyde and Carvacrol. Journal of Agricultural and Food Chemistry. 2012. Retrieved from URL: <https://pubs.acs.org/doi/10.1021/jf301281a#>.

Enjoy! Easy Japanese Cooking! Oct. 8, 2008. Retrieved from URL: <http://enjoy-easyjapanesecooking.blogspot.com/2008/10/inari-sushigreat-for-potluck-party.html>.

Remington's. "Remington's Pharmaceutical Science 17$^{th}$ Edition". Gannaro, A (Ed.) pp. 37, 1517-1518. (Year: 1985).

Seedher et al. International Journal of Biological Chemistry 1 (3): 162-167 (Year:2007).

International Search Report for PCT/EP2017/058121 dated May 8, 2017, 3 pages.

VEGETABLE PAPER COMPRISING FIBRES OF A PLANT

This application is a 371 of PCT/EP2017/058121 filed 5 Apr. 2017.

The invention relates to a vegetable paper comprising fibres of a plant which has undergone extraction in a solvent.

Since conventional paper is formed from forest wood fibres, mainly cellulose fibres, the paper industry is a very large consumer of wood from forests. Specifically, between two and three tonnes of wood are required to manufacture one tonne of conventional paper. Furthermore, since 1950, the worldwide consumption of paper has incessantly increased, for example, in France, it has been multiplied by ten. This increase in consumption has an impact on the forests of the planet, 80% of which would have disappeared as a result of human activity.

During the manufacture of paper, the wood bark is first removed, and the debarked wood then undergoes various delignification treatments for the production of paper pulp, which is the raw material for making paper. The aim of these treatments is to delignify the wood fibres, i.e. to dissolve the lignin present in the wood and which maintains the cohesion between the wood fibres, thereby allowing the wood fibres to be separated. Typically, these delignification treatments are those known as mechanical pulp, thermomechanical pulp, chemimechanical pulp or chemical pulp treatments. These treatments are highly energy-consuming and may require the use of hazardous chemical products such as sodium hydroxide.

Furthermore, whatever the treatment used, the paper pulp obtained has a colour tending toward brown. Bleaching is thus an absolutely necessary treatment for manufacturing white paper. However, the bleaching of paper requires the use of chlorine or hydrogen peroxide, which are hazardous compounds.

In order to limit the impact of paper production, one idea consists in recycling conventional paper for reuse of the recycled wood fibres. However, recycling requires the establishment of expensive channels for collecting and conveying to the retreatment factories. Recycled wood fibres must also undergo a treatment requiring a large volume of hot water, which is thus energy-consuming, to separate and deink the fibres. Furthermore, the paper pulp obtained must also undergo the bleaching treatment. The paper obtained from recycled wood fibres is of poorer quality. Recycling therefore does not make it possible to entirely limit the ecological impact of paper production.

It is also possible, in order to limit the ecological impact of paper production, to substitute wood fibres with vegetable fibres originating from plants, which are not trees, these fibres possibly originating from industrial plant residues. An example that may be mentioned is the paper described in patent application EP 0 645 491. In this paper, from 5% to 40% by mass of wood fibres are substituted with a vegetable substance derived from a plant, the vegetable substance comprising both the fibrous parts and the non-fibrous parts of the plant. However, as taught in patent application EP 0 645 491, if more than 40% by mass of wood fibres are substituted with this vegetable substance, then the physical and mechanical properties of the paper described and its use are impaired. Consequently, at least 60% by mass of the wood fibres of the paper described undergo the treatments described above.

The inventors have developed a vegetable paper involving extraction in a solvent.

The present invention describes a vegetable paper comprising fibres of a plant which has undergone extraction in a solvent. The amount of fibres of the plant which has undergone extraction in the solvent in the vegetable paper according to the invention is at least 50% by weight relative to the total weight of fibres of said vegetable paper. The vegetable paper according to the invention comprises less than 10% of extract of the plant that is soluble in the solvent by weight of dry matter of said vegetable paper.

The fibres according to the invention correspond to the fibrous parts of the plant, whereas the extract of the plant that is soluble in the solvent corresponds to all of the non-fibrous parts of the plant which are soluble in the solvent, said plant having undergone extraction in the solvent.

The extraction in the solvent performed to obtain the fibres according to the invention is a mild method which does not involve compounds such as sodium hydroxide. It is also different from the delignification treatments used for the production of paper pulp and from the bleaching treatments. Typically, the delignification treatments are those known as mechanical pulp, thermomechanical pulp, chemimechanical pulp or chemical pulp treatments. Typically, the bleaching treatments are those using chlorine, chlorine dioxide, oxygen, ozone or hydrogen peroxide. Advantageously, the ecological impact of extraction in a solvent according to the invention is less than that of the delignification and bleaching treatments mentioned above. Consequently, the ecological impact of the vegetable paper according to the invention is less than the ecological impact of a conventional paper.

According to a particular embodiment, the solvent is an aqueous solvent, most particularly the solvent is water.

Typically, the aqueous solvent may be a 70-30 water/alcohol mixture.

According to the embodiment in which the solvent is water, the extraction is performed at atmospheric pressure and the water temperature is from 40° C. to 100° C., in particular from 60° C. to 90° C., more particularly from 70° C. to 80° C.

Typically, the fibres according to the invention are obtained after extraction in the solvent and separation of the extract that is soluble in the solvent. The fibres according to the invention may thus comprise a residual fraction of the extract that is soluble in the solvent, which explains why the vegetable paper according to the invention comprises less than 10% of extract of the plant that is soluble in the solvent by weight of dry matter of said vegetable paper. Typically, the vegetable paper according to the invention comprises less than 5%, less than 4%, less than 3%, less than 2%, less than 1% of extract of the plant that is soluble in the solvent by weight of dry matter of said vegetable paper. According to a particular embodiment, the vegetable paper according to the invention does not comprise any extract of the plant that is soluble in the solvent.

The following technique will be used to determine the percentage of extract that is soluble in the solvent by weight of dry matter of the vegetable paper. The vegetable paper to be analysed is ground so as to achieve a particle size of less than or equal to 2 mm. The ground vegetable paper is then mixed with boiling water for ten minutes so as to extract the extract that is soluble in the solvent. The weight of dry matter of the vegetable paper extract that is soluble in the solvent is calculated by difference between the dry weight of the vegetable paper sample and the dry weight of the fibrous remainder after extraction.

The extraction in the solvent makes it possible to reach the small amount, or even the absence of extract that is soluble in the solvent in the vegetable paper according to the invention. Without wishing to be bound by any theory, the inventors are of the opinion that the extraction in the solvent gives the vegetable paper according to the invention its mechanical and sensory properties. Typically, the odour of the vegetable paper is neutral and its surface is non-tacky. The colour of the vegetable paper may also be natural.

The vegetable paper may be obtained from any type of plant, in particular cocoa tree, coffee tree, tea tree, vine, ginger, ginkgo, camomile, tomato, ivy, maté, rooibos, cucumber, mint, a cereal such as wheat, barley or rye, or a tree such as broadleaved or resinous trees.

The fibres according to the invention may also originate from a plant mixture. Advantageously, this makes it possible to have a wide choice of fibres according to the invention and thus to obtain a vegetable paper whose mechanical and sensory properties may be adapted to the use of said paper. According to a preferred embodiment, the plant is the cocoa tree, coffee tree or tea tree. Typically, a plant mixture is tea tree and mint.

Typically, the vegetable paper results from the whole plant, from a plant part or from a mixture of different plant parts. The plant part may be a plant part per se, for instance tea leaf. The plant part may also be the result of mechanical, chemical or mechanochemical transformation of one or more plant parts, for instance the husk protecting the cocoa bean resulting from the bean shelling process, the film surrounding the coffee grain, beer draff, grape marc, cucumber stalk or tomato leaf. In particular, the plant part is the tea leaf, the husk protecting the cocoa bean resulting from the bean shelling process, the film surrounding the coffee grain, beer draff or grape marc.

According to a preferred embodiment, the plant part is the husk protecting the cocoa bean, the film surrounding the coffee grain, or the tea leaf.

According to a particular embodiment, the plant part is not a part used for paper manufacture, in particular sapwood, heart wood and pith of the tree. The vegetable paper according to this embodiment does not involve a delignification process. Its ecological impact is thus very much less than the ecological impact of a conventional paper.

Typically, the fibres according to the invention represent from 50% to 90%, in particular from 60% to 80% by weight relative to the total amount of fibres of the vegetable paper.

The vegetable paper may also comprise delignified fibres commonly used in the paper industry. Typically, these fibres have undergone a delignification treatment commonly used in the papermaking industry and, optionally, a bleaching treatment. Typically, these fibres may be Tencell® fibres (ground cellulose fibres dissolved in N-methylmorpholine N-oxide monohydrate) or fibres derived from hemp, bamboo, cotton, kapok, coconut, flax, ramie, jute, sisal, kenaf, abaca, raffia, papyrus, reed, wheat, sugarcane, corn, sorghum and trees such as broadleaved or resinous trees. Typically, the amount of these fibres in the vegetable paper according to the invention is from 0% to 50%, preferably from 10% to 45%, even more preferentially from 20% to 40% by weight relative to the total amount of vegetable paper fibres.

Alternatively, or in addition to the delignified fibres commonly used in the papermaking industry, the vegetable paper may comprise synthetic fibres. Typically, the synthetic fibres are organic or mineral synthetic fibres. For example, an organic synthetic fibre is a fibre of polylactic acid, polyamides, polyesters such as PET, chlorofibres, an acrylic fibre, a vinyl fibre, an elastodiene, a vinylal, an elastane, an aramid fibre, a polybenzimidazole fibre, a polypropylene fibre, a polyethylene fibre, a polyphenolic fibre, a polyurea fibre, a polyurethane fibre, a textilene, a viscose such as Rayon or a mixture thereof. A mineral fibre is, for example, a glass fibre, a ceramic fibre such as silicon carbide (SiC), a fibre of a ductile material such as gold, silver or aluminium, a carbon fibre, a boron fibre, or a mixture thereof. Typically, the amount of synthetic fibres in the vegetable paper according to the invention is from 5% to 50%, preferably from 10% to 40%, even more preferentially from 15% to 30% by weight relative to the total weight of vegetable paper fibres.

The delignified fibres commonly used in the papermaking industry and the synthetic fibres may be added to the vegetable paper so as to modify the properties of said vegetable paper. Typically, the properties of the vegetable paper that may be modified are the mechanical strength properties such as the tensile strength, the tear strength, the burst strength, the folding resistance or the flexural strength, the surface strength and the creep strength, in particular the mechanical strength properties such as the tensile strength, the tear strength, the burst strength, the folding resistance or the flexural strength, the optical properties such as the whiteness, the opacity or the gloss, or the textural properties such as the grammage, the porosity or the permeability to air or to a liquid.

Typically, the vegetable paper may comprise an additive usually used for manufacturing conventional papers so as to develop or give the vegetable paper new properties, for instance chemical, optical, sensory or mechanical properties such as tear strength or folding resistance.

Typically, an additive may be a wet strength agent, an oil-barrier and fat-barrier agent, a antiblocking agent, a dry strength agent, a softener, a lotion composition, a wetting agent or latices such as latices applied as a surface pattern, in particular a wet strength agent, a dry strength agent, a softener, a lotion composition, a wetting agent, or latices such as latices applied as a surface pattern.

A wet strength agent makes it possible to reduce the potential degradation of the vegetable paper if the latter is placed in contact with a liquid, such as water. Typically, the wet strength agent may be chosen from polyamides, such as epichlorohydrin resin, a polyamine-epichlorohydrin resin, a poly(aminoamide)-epichlorohydrin resin, a urea-formaldehyde resin, a melamine-formaldehyde resin; an alkyl-ketene dimer; alkylsuccinic anhydride; a polyvinylamine; an oxidized polysaccharide. Typically, the amount of wet strength agent is from 0.1% to 30%, preferably from 1% to 15%, even more preferentially from 5% to 10% by dry weight of the vegetable paper.

An oil-barrier and fat-barrier agent makes it possible to reduce the absorption of fats by the paper. Typically, the oil-barrier and fat-barrier agent may be chosen from carboxymethylcellulose, polyacrylamides, acrylic esters and latices.

A antiblocking agent makes it possible to limit the adhesion of a material to the paper. Typically, the antiblocking agent may be chosen from carboxymethylcellulose, polyacrylamides, acrylic esters, silicones and latices.

A dry strength agent makes it possible to increase the resistance of the vegetable paper if the latter is subjected to large mechanical stresses. The dry strength agent may be chosen from starches and modified gums, cellulose polymers, synthetic polymers, for instance carboxymethylcellulose and polyacrylamides. Typically, the amount of dry strength agent is from 0.1% to 30%, preferably from 1% to 15%, even more preferentially from 5% to 10% by dry weight of the vegetable paper.

A softener makes it possible to improve the softness of the vegetable paper according to the invention. Typically, a softener is a fatty acid, a siloxane compound, a silicone compound, an aminosilicone compound, an extract of aloe vera, an extract of sweet almond, an extract of camomile, a quaternary ammonium compound. Typically, the amount of softener is from 0.1% to 30%, preferably from 1% to 15%, even more preferentially from 5% to 10% by dry weight of the vegetable paper.

Typically, the additive may also be a filler such as kaolin, calcium carbonate, talc, barium sulfate, a bentonite, a zeolite, a silicate, a colorant, or a mixture thereof. The addition of this filler may modify some of the mechanical properties of the vegetable paper, in particular the properties allowing it to be printed or written on it. This filler may also give the vegetable paper certain sensory properties. Typically, the colorant gives the vegetable paper its colour. Typically, the amount of filler in the vegetable paper according to the invention is from 0% to 50%, preferably from 5% to 30%, even more preferentially from 10% to 20% by dry weight of the plant paper.

By virtue of its mechanical and sensory properties, the vegetable paper according to the invention may be used as wrapping paper or as a primary, secondary or tertiary wrapping element, in particular food wrapping, cosmetic product wrapping or cleaner wrapping. The vegetable paper may also be used as decorative paper (wallpaper) or as writing paper.

According to one embodiment of the invention, the wrapping paper, in particular for food wrapping, cosmetic product wrapping or cleaner wrapping, may comprise the vegetable paper according to the invention, in particular the vegetable paper according to the invention as primary, secondary or tertiary wrapping element.

When a food wrapping paper comprises the vegetable paper according to the invention, then the additive that the vegetable paper according to the invention may comprise is preferably chosen from a list of additives recommended for the manufacture of food wrapping paper. Typically, such a list may be the recommendation list BFR XXXVI/1, the recommendation list BFR XXXVI/2, the FDA 21 regulation list, the CFR 176.170 regulation list or the CFR 176.180 regulation list.

According to one embodiment of the invention, the vegetable paper according to the invention may be a vegetable cardboard. For the purposes of the present invention, the term "vegetable cardboard" means a vegetable paper with a grammage of from 200 g/m$^2$ to 500 g/m$^2$, in particular from 225 g/m$^2$ to 300 g/m$^2$, more particularly from 240 g/m$^2$ to 280 g/m$^2$.

According to one embodiment of the invention, the decorative paper may comprise the vegetable paper according to the invention.

According to one embodiment of the invention, the writing paper may comprise the vegetable paper according to the invention.

Typically, the vegetable paper according to the invention, included in the food wrapping paper, may be used for wrapping any type of food, such as meat, fish, cheese, insects, vegetables, fruit, drinking bottles, bakery products or chocolate, whether for cold applications or for hot applications such as cooking.

Typically, the vegetable paper according to the invention, comprised in the cosmetic product wrapping paper, may be used for wrapping any type of solid cosmetic product such as soap in solid form (Marseille soap), eyeshadow, lipstick or lip balm.

Typically, the vegetable paper according to the invention, comprised in the cleaner wrapping paper, may be used for wrapping cleaners in solid form, such as a washing product, a stain remover, a washing-up cleaning product, a household cleaner or a deodorizer.

Depending on its use, the vegetable paper according to the invention may comprise an extract of a plant having a cosmetic property such as hair dyeing, skin colouring or weight loss, an extract of a plant having a dermatological property such as the cleaning of skin wounds and injuries, combatting scalp itching and dandruff, soothing the skin in the case of chapping or dryness, insect bites, abrasion, burns and gluteal erythema, an extract of a plant used for a therapeutic application such as eye irritation, bronchial disorders, coughing or colds.

By virtue of its sensory properties, and in particular its natural colour, the vegetable paper according to the invention may be incorporated into a handkerchief, a cleaning wipe or a cosmetic product. Specifically, the natural colour of the vegetable paper according to the invention may reassure the user as regards the non-toxic nature of the cleaning wipe or of the cosmetic product that he may use on his skin.

Typically, the handkerchief according to the invention may comprise, in addition to the vegetable paper according to the invention, a softener such as a fatty acid, a siloxane compound, a silicone compound, an aminosilicone compound, an extract of aloe vera, an extract of sweet almond, an extract of camomile, a quaternary ammonium compound, a biocidal compound such as a disinfectant, an antimicrobial agent, an antibacterial agent or a mixture thereof, a decongestant such as an extract of menthol or eucalyptus, a fragrance, a moisturizing compound such as vitamin E, or a mixture thereof.

Typically, the cleaning wipe according to the invention may comprise, in addition to the vegetable paper according to the invention, a biocidal compound such as a disinfectant, an antimicrobial agent, an antibacterial agent, or a mixture thereof.

Typically, the cleaning wipe according to the invention may be for use as body care or for household maintenance.

Typically, the cosmetic product according to the invention may comprise, in addition to the vegetable paper according to the invention, an active principle chosen from sebum regulating agents, antimicrobial agents, matting agents, astringents, acidifying agents, cicatrizing agents, exfoliants or kerato-regulating agents, occlusive agents, protective agents, emollients, nourishing agents, moisturizers, antiageing agents, calmatives, decongestants or venotonic agents, UV-screening agents, wetting agents, hygroscopic agents, gelling agents, free-radical scavengers, cell regenerators or cell stimulators, firming agents, tensioning agents, antiglycation agents, lightening agents, or a mixture thereof.

Typically, the cosmetic product may be a face mask, a patch for the eyes or a body wrap.

Typically a face mask presents a grammage of from 30 g/m$^2$ to 150 g/m$^2$, in particular from 40 g/m$^2$ to 100 g/m$^2$, more particularly from 50 g/m$^2$ to 85 g/m.

A papermaking process may typically be used for manufacturing the vegetable paper according to the invention. Specifically, the small amount of extract that is soluble in the solvent facilitates the use of the fibres according to the invention in a papermaking process during the manufacture of the vegetable paper. Specifically, the sugars, proteins and colloids (pectins, starches) naturally present in the extract that is soluble in the solvent may give rise to problems, such as bonding to the drying cylinders, difficulties in draining or problems of fermentation in the tanks.

According to a preferred embodiment according to the invention, a papermaking process will be used. According to this embodiment, a vegetable paper according to the invention is a vegetable paper that may be obtained via a papermaking processing.

The vegetable paper according to the invention is manufactured via a papermaking process comprising the following steps:
- one or more plant parts are mixed with the solvent so as to extract the plant extract that is soluble in the solvent,
- the extract that is soluble in the solvent is then separated from the fibrous parts of the plant so as to obtain the fibres according to the invention,
- the fibres according to the invention are passed into a paper machine so as to manufacture the vegetable paper.

Typically, the fibres according to the invention are obtained via an extraction and separation process. In such a process, one or more plant parts are mixed with the solvent, for example in an extractor, so as to extract the extract of the plant that is soluble in the solvent. The plant extract that is soluble in the solvent is then separated from the fibrous parts, for example by passing it through a screw press, to obtain, on the one hand, the fibres according to the invention, and, on the other hand, the extract that is soluble in the solvent. In such an extraction and separation process, the fibres according to the invention are extracted and then separated from the extract that is soluble in the solvent.

According to one embodiment, the fibres according to the invention may originate from different plants.

According to this embodiment, it is possible to separately obtain the fibres according to the invention of each plant. It is also possible to obtain the fibres according to the invention together by combining one or more of the different plant parts and then mixing them with the solvent, for example in an extractor, so as to extract the extracts of the different plants that are soluble in the solvent. The solvent temperature will be adapted to the plants to be treated and, in particular, to the plant requiring the highest solvent temperature to extract the extract of this plant that is soluble in the solvent. The extracts of the different plants that are soluble in the solvent are then separated from the fibrous parts, for example by passing through a screw press, to isolate and obtain, on the one hand, the fibres according to the invention, and, on the other hand, the extracts of the different plants that are soluble in the solvent. According to this alternative, the solvent temperature may be adapted to the part(s) of the different plants to be treated. This alternative embodiment is very advantageous since it makes it possible to obtain the fibres according to the invention of the different plants without using several processes in parallel.

According to a particular embodiment, the solvent is an aqueous solvent, and more particularly the solvent is water.

According to the embodiment in which the solvent is water, the extraction is performed at atmospheric pressure and the water temperature may be adapted to the plant to be treated, and in particular to the plant part(s) to be treated. Typically, the water temperature is from 40° C. to 100° C., in particular from 60° C. to 90° C., more particularly from 70° C. to 80° C.

If the vegetable paper comprises fibres according to the invention originating from different plants, then the different fibres according to the invention may be mixed before passing through the paper machine so as to manufacture the vegetable paper according to the invention. The different fibres according to the invention may also, alternatively or according to a predefined scheme, pass through the paper machine so as to manufacture the vegetable paper according to the invention.

If the vegetable paper comprises delignified fibres commonly used in the papermaking industry, then the fibres according to the invention and the delignified fibres commonly used in the papermaking industry may be mixed before passing through the paper machine so as to manufacture the vegetable paper according to the invention. The fibres according to the invention and the delignified fibres commonly used in the papermaking industry may also alternatively pass through the paper machine so as to manufacture the vegetable paper according to the invention.

If the vegetable paper comprises synthetic fibres, then the fibres according to the invention and the synthetic fibres may be mixed before passing through the paper machine so as to manufacture the vegetable paper according to the invention. The fibres according to the invention and the synthetic fibres may also alternatively pass through the paper machine so as to manufacture the vegetable paper according to the invention.

If the vegetable paper comprises delignified fibres commonly used in the papermaking industry and synthetic fibres, then the fibres according to the invention, the delignified fibres commonly used in the papermaking industry and the synthetic fibres may be mixed before passing through the paper machine so as to manufacture the vegetable paper according to the invention. The fibres according to the invention, the delignified fibres commonly used in the papermaking industry and the synthetic fibres may also, alternatively or according to a predefined scheme, pass through the paper machine so as to manufacture the vegetable paper according to the invention.

If the vegetable paper comprises a wet strength agent, then this wet strength agent may be added to the fibres according to the invention before they pass through the paper machine so as to manufacture the vegetable paper according to the invention. The wet strength agent may also be added directly to the vegetable paper formed by means of a size press, coating or spraying.

If the vegetable paper comprises an additive such as an oil-barrier and fat-barrier agent and/or a antiblocking agent, then this additive is added to the paper surface with the aid of a size press, coating or spraying so as to manufacture the vegetable paper according to the invention.

If the vegetable paper comprises a dry strength agent, then this dry strength agent is added to the fibres according to the invention before they pass through the paper machine so as to manufacture the vegetable paper according to the invention. The dry strength agent may also be added directly to the vegetable paper formed with the aid of a size press, coating or spraying.

If the vegetable paper comprises an additive, then this additive may be added to the fibres according to the invention before they pass through the paper machine so as to manufacture the vegetable paper according to the invention. The additive may also be added directly to the vegetable paper formed with the aid of a size press, coating or spraying.

Typically, the fibres according to the invention may pass, for example, through a refiner to obtain refined fibres. These refined fibres are then passed through the paper machine so as to manufacture the vegetable paper according to the invention.

Once manufactured, the vegetable paper may be dried with a drying device.

The vegetable paper may then be formed into sheets or leaflets or rolled up as a roll which may then be cut into reels, strips, dishes, a cup, a mug, a bowl, a salad bowl, a vial, a cauldron, bottles, straws, tubes or a disc.

The vegetable paper may also undergo additional processes known in the papermaking industry.

Typically, one of these processes allows the manufacture of a multilayer vegetable paper using multiple headboxes.

Another of these additional processes is hydroentanglement. This process uses high-pressure waterjets to entangle the fibres. Gripped between a grate and a compression strip, the vegetable paper according to the invention is first compacted and wetted to prevent the formation of air pockets. The vegetable paper according to the invention, circulating on a perforated cylinder covered with a fine gauze, is subjected to high-pressure waterjets, typically at 150 to 250 bar on one face, and then on the other. The injectors are holes, typically from 80 to 150 µm in diameter, arranged at a rate of 1 to 3 holes per millimeter, on rows typically separated by 3 to 5 mm. The water pressure increases from the first to the last injectors. To prevent drowning of vegetable paper according to the invention, the interior of the cylinders is under a negative pressure. The residual water is removed first by suction, and then by drying.

Advantageously, the sensory properties, in particular the softness, and the absorption capacity of the vegetable paper which has undergone the hydroentanglement process are improved. Furthermore, the vegetable paper that has undergone the hydroentanglement process may form harmonious folds when it is suspended, it has greater tensile strength, and is readily formed. The vegetable paper that has undergone the hydroentanglement treatment may thus be used in an application in which a pleasant feel is primordial, for instance as a hygiene paper. It may also be used as an absorbent paper. Due to the improvement in its sensory properties, and in particular its softness, the vegetable paper that has undergone the hydroentanglement treatment may also, advantageously, be incorporated into a handkerchief, cleaning wipe or cosmetic product described previously.

According to one embodiment of the invention, the hygiene paper may comprise the vegetable paper according to the invention.

According to one embodiment of the invention, the absorbent paper may comprise the vegetable paper according to the invention.

The vegetable paper according to the invention may also be used with a second paper to form a hybrid paper. This second paper may be manufactured via processes known to those skilled in the art, such as the wet laid process, the drylaid carded process using long artificial or natural fibres, or the airlaid process using long artificial or natural fibres. This second paper may also be a spunbound support.

According to one embodiment of the invention, the hybrid paper may comprise the vegetable paper according to the invention and the second paper; in particular, the vegetable paper is complexed with the second paper.

Typically, the hybrid paper may be obtained via a hydroentanglement process using the vegetable paper according to the invention, as first layer, and the second paper, as second layer.

According to one embodiment, the invention also relates to a process for manufacturing a hybrid paper in which the vegetable paper according to the invention is complexed with a second paper by hydro entanglement.

According to this embodiment, the second paper is as described above in relation with the hybrid paper.

According to a particular embodiment, the plant is the cocoa tree and the fibres according to the invention then originate from the husk protecting the cocoa bean.

Advantageously, the husk is waste material derived from the industrial production of cocoa. By using the husk to obtain the fibres according to the invention included in the vegetable paper according to the invention, this waste material may thus be recovered and thus limit the ecological impact of this vegetable paper.

Typically, the vegetable paper may be obtained from any variety of husks protecting the cocoa bean (for example from trinitario, criollo, forastero, cupuaçu, nacional or mixtures of cocoa tree varieties). Typically, the vegetable paper results from the treatment of different varieties of husks protecting the cocoa bean.

Typically, the amount of fibres according to the invention originating from the husk protecting the cocoa bean in the vegetable paper is at least 50%, in particular from 50% to 90%, even more particularly from 60% to 80% by weight relative to the total amount of vegetable paper fibres.

Typically, the vegetable paper comprising fibres according to the invention originating from the husk protecting the cocoa bean comprises less than 10%, less than 5%, less than 4%, less than 3%, less than 2%, less than 1% by weight of dry matter of the vegetable paper of extract that is soluble in the solvent. According to a particular embodiment, the vegetable paper comprising fibres according to the invention originating from the husk protecting the cocoa bean does not comprise any extract that is soluble in the solvent.

Advantageously, the vegetable paper according to the invention comprising the fibres according to the invention originating from the husk protecting the cocoa bean is sparingly brittle and particularly resistant to folding. Furthermore, its odour is neutral. It is also possible to print on the vegetable paper according to the invention comprising the fibres according to the invention originating from the husk protecting the cocoa bean.

By virtue of its mechanical and sensory properties, the vegetable paper according to the invention comprising the fibres according to the invention originating from the husk protecting the cocoa bean may be used as wrapping paper, in particular for food wrapping, cosmetic product wrapping, cleaner wrapping, or used as cooking paper, decorative paper (wallpaper), writing paper, or as a cleaning wipe or cosmetic product.

Typically, the use of such a vegetable paper for wrapping chocolate products is particularly attractive since it is possible to recycle by-products generated upstream of the chocolate manufacturing process, thus participating in the concept of the circular economy. This vegetable paper based on the husk protecting the cocoa bean may then be used for manufacturing a multitude of wrappings: tablet packaging, chocolate square packaging, boxes and packages, flexible sachets, confectionary packaging.

Typically, the vegetable paper according to the invention comprising the fibres according to the invention originating from the husk protecting the cocoa bean is manufactured via a papermaking process comprising the following steps:
  the husk protecting the cocoa bean is mixed with a solvent so as to extract of the cocoa tree that is soluble in the solvent,
  the extract of the cocoa tree that is soluble in the solvent is then separated from the fibrous parts of the cocoa tree so as to obtain the fibres according to the invention,
  the fibres according to the invention are passed through a paper machine so as to manufacture the vegetable paper.

Typically, a husk protecting the cocoa bean may comprise up to 50% by weight of extract that is soluble in the solvent relative to the total weight of the husk. It is thus necessary to adapt the process to extract and then separate the fibres according to the invention of the husk from the extract that is soluble in the solvent.

According to a particular embodiment, the solvent is an aqueous solvent, and most particularly the solvent is water.

According to the embodiment in which the solvent is water, the extraction is performed at atmospheric pressure and the water temperature is from 30° C. to 100° C., in particular from 40° C. to 90° C., more particularly from 60° C. to 80° C.

Typically, the mixing time is from 5 min to 180 min, in particular from 10 min to 60 min, more particularly from 20 min to 45 min.

Before passing through the paper machine, the fibres according to the invention comprise less than 10% by weight of extract that is soluble in the solvent relative to the total weight of the fibres according to the invention.

The residual weight amount of extract that is soluble in the solvent is measured by weighing the drained fibres before and after the extraction.

According to a particular embodiment, the plant is the coffee tree and the fibres according to the invention then originate from the film surrounding the coffee grain.

Advantageously, the film is waste material derived from the industrial production of coffee. By using the film to obtain the fibres according to the invention included in the vegetable paper according to the invention, this waste material may thus be recovered and thus limit the ecological impact of the vegetable paper.

According to this embodiment, the vegetable paper may be obtained from any variety of coffee tree. Typically, the vegetable paper results from the treatment of different varieties of coffee tree.

Typically, the amount of fibres according to the invention originating from the film surrounding the coffee grain in the vegetable paper is at least 50%, in particular from 50% to 90%, even more particularly from 60% to 80% by weight relative to the total amount of fibres of the vegetable paper.

Typically, the vegetable paper comprising fibres according to the invention originating from the film surrounding the coffee grain comprises less than 10%, less than 5%, less than 4%, less than 3%, less than 2%, less than 1% by weight of dry matter of the vegetable paper of extract that is soluble in the solvent. According to a particular embodiment, the vegetable paper comprising fibres according to the invention originating from the film surrounding the coffee grain does not comprise any extract that is soluble in the solvent.

Advantageously, the vegetable paper according to the invention comprising fibres according to the invention originating from the film surrounding the coffee grain is thus sparingly brittle and particularly resistant to folding. Furthermore, its odour is neutral.

By virtue of its mechanical and sensory properties, the vegetable paper according to the invention comprising fibres according to the invention originating from the film surrounding the coffee grain may be used as wrapping paper, in particular for food wrapping, cosmetic product wrapping, cleaner wrapping, or used as decorative paper (wallpaper), writing paper, or as a cleaning wipe or cosmetic product.

Typically, the use of such a vegetable paper for wrapping products comprising coffee such as coffee powder is particularly attractive since it is possible to recycle by-products generated upstream of the process for manufacturing these products, thus participating in the concept of the circular economy.

Typically, the vegetable paper according to the invention comprising fibres according to the invention originating from the film surrounding the coffee grain is manufactured via a papermaking process comprising the following steps:
 the film surrounding the coffee grain is mixed with a solvent so as to extract the extract of the coffee tree that is soluble in the solvent,
 the extract of the coffee tree that is soluble in the solvent is then separated from the fibrous parts of the coffee tree so as to obtain the fibres according to the invention,
 the fibres according to the invention are passed through a paper machine so as to manufacture the vegetable paper.

Typically, a film surrounding the coffee grain may comprise up to 40% by weight of extract that is soluble in the solvent relative to the total weight of the film. It is thus necessary to adapt the process to extract and then separate the fibres according to the invention of the film from the extract that is soluble in the solvent.

According to a particular embodiment, the solvent is an aqueous solvent, and most particularly the solvent is water.

According to the embodiment in which the solvent is water, the extraction is performed at atmospheric pressure and the water temperature is from 30° C. to 100° C., in particular from 40° C. to 90° C., more particularly from 60° C. to 80° C.

Typically, the mixing time is from 5 min to 180 min, in particular from 10 min to 60 min, more particularly from 20 min to 45 min.

Before passing through the paper machine, the fibres according to the invention comprise less than 10% by weight of water extract relative to the total weight of the fibres according to the invention.

The residual weight amount of extract that is soluble in the solvent is measured by weighing the drained fibres before and after extraction.

According to a particular embodiment, the plant is the tea tree and the fibres according to the invention then originate from tea leaves.

Typically, the tea leaves used originate from threshing or from mixing and chopping into shreds of the tea leaves or from tea leaf debris. The tea leaves used are advantageously waste material derived from the industrial production of tea. By using them to obtain the fibres according to the invention included in the vegetable paper according to the invention, this waste material may thus be upgraded and thus limit the ecological impact of the vegetable paper.

According to this embodiment, the vegetable paper may be obtained from any variety of tea tree. Typically, the vegetable paper results from the treatment of different varieties of tea tree.

Typically, the amount of fibres according to the invention originating from tea leaves is at least 50%, in particular from 50% to 90%, even more particularly from 60% to 80% by weight relative to the total amount of vegetable paper fibres.

Typically, the vegetable paper comprising fibres according to the invention originating from tea leaves comprises less than 5%, less than 4%, less than 3%, less than 2%, less than 1% by weight of dry matter of the vegetable paper of extract that is soluble in the solvent. According to a particular embodiment, the vegetable paper comprising fibres according to the invention originating from tea leaves does not comprise any extract that is soluble in the solvent.

Advantageously, the vegetable paper according to the invention comprising fibres according to the invention originating from tea leaves is thus sparingly brittle and particularly resistant to folding. Furthermore, its odour is neutral and it is not tacky.

By virtue of its mechanical and sensory properties, the vegetable paper according to the invention comprising fibres according to the invention originating from tea leaves may be used as wrapping paper, in particular for food wrapping, cosmetic product wrapping, cleaner wrapping, or used as decorative paper (wallpaper), as writing paper, or as a cleaning wipe or cosmetic product.

Typically, the use of such a vegetable paper for product wrapping comprising tea is particularly attractive since it is possible to recycle by-products generated upstream of the process for manufacturing these products, thus participating in the concept of the circular economy.

Typically, the vegetable paper according to the invention comprising fibres according to the invention originating from tea leaves is manufactured via a papermaking process comprising the following steps:
    the tea leaves are mixed with a solvent so as to extract the extract of tea leaf that is soluble in the solvent,
    the extract of tea leaf that is soluble in the solvent is then separated from the fibrous parts of the tea tree so as to obtain the fibres according to the invention,
    the fibres according to the invention are passed through a paper machine so as to manufacture the vegetable paper.

Typically, a tea leaf may comprise up to 50% by weight of extract that is soluble in the solvent relative to the total weight of the leaf. It is thus necessary to adapt the process to extract and then separate the fibres according to the invention of the leaf from the leaf extract that is soluble in the solvent.

According to a particular embodiment, the solvent is an aqueous solvent, and most particularly the solvent is water.

According to the embodiment in which the solvent is water, the extraction is performed at atmospheric pressure and the water temperature is from 30° C. to 100° C., in particular from 40° C. to 90° C., more particularly from 60° C. to 80° C.

Typically, the mixing time is from 5 min to 180 min, in particular from 10 min to 60 min, more particularly from 20 min to 45 min.

Before passing through the paper machine, the fibres according to the invention comprise less than 10% by weight of extract that is soluble in the solvent relative to the total weight of the fibres according to the invention.

The residual weight amount of extract that is soluble in the solvent is measured by weighing the drained fibres before and after extraction.

EXAMPLE

1°) Cocoa Tree Vegetable Paper

A vegetable paper according to the invention comprising fibres originating from cocoa tree was manufactured according to the following method: cocoa husks were ground using a knife mill so as to obtain particles about 1 mm in size. The ground husk material was then mixed with water at 70° C. for 20 minutes, in a husk/water ratio of 1/10. The mixture is then centrifuged so as to separate the aqueous part (cocoa husk fluid) from the insoluble part (cocoa husk fibres). The fibrous fraction is refined using a disc refiner. After refining, delignified fibres originating from resinous trees are added to the refined fibre fraction according to the invention in a ratio of delignified fibres/fibres according to the invention from cocoa tree of 40%/60% so as to manufacture vegetable paper sheets. The vegetable paper sheets are then dried on a hotplate.)

2°) Coffee Tree Vegetable Paper

A vegetable paper according to the invention comprising fibres originating from coffee tree was manufactured according to the following method: the films surrounding the coffee grains were mixed with water at 70° C. for 20 minutes, in a film/water ratio of 1/5 by weight. The mixture then undergoes an extraction step in a hydraulic press to separate the aqueous part (coffee film fluid) from the insoluble part (coffee film fibres). The recovered insoluble part is heated a second time at 70° C. for 10 minutes with an insoluble part/water ratio of 1/5 by weight. After an additional extraction (by pressing), the sample is refined using a disc refiner. After refining, delignified fibres originating from resinous trees are added to the refined fibre fraction according to the invention in a ratio of delignified fibres/fibres according to the invention from coffee tree of 10%/90% so as to manufacture vegetable paper sheets. The vegetable paper sheets are then dried on a hotplate.)

3°) Tea Tree Vegetable Paper

A vegetable paper according to the invention comprising fibres originating from tea tree was manufactured according to the following method: black tea leaves were mixed with water at 70° C. for 20 minutes, in a tea/water ratio of 1/5 by weight. The mixture then undergoes an extraction step in a hydraulic press to separate the aqueous part from the insoluble part (tea fibres). The recovered insoluble part is heated a second time at 70° C. for 10 minutes with an insoluble part/water ratio of 1/5 by weight. After an additional extraction (by pressing), the sample is refined using a disc refiner. After refining, cellulose fibres (mixture of abaca, resinous tree pulp and broadleaved tree pulp in a 60/10/30 ratio) are added to the refined delignified fibres in a ratio of delignified fibres/fibres according to the invention from tea tree of 10%/90% by weight so as to manufacture vegetable paper sheets. The vegetable paper sheets are then dried on a hotplate.)

4°) Green Tea Vegetable Cardboard for Secondary Wrapping (Tea Carton)

A vegetable cardboard according to the invention comprising fibres originating from tea tree was manufactured according to the following method: green tea leaves were ground using a knife mill so as to obtain particles about 1 mm in size. The ground leaf material is then mixed with water at 70° C. for 45 minutes, in a ground tea leaf/water ratio of 1/10. The mixture is then centrifuged so as to separate the aqueous part (tea leaf fluid) from the insoluble part (tea fibres). The insoluble part is refined using a disc refiner. After refining, delignified fibres originating from resinous trees are added to the refined insoluble part in a ratio of delignified fibres/refined insoluble part of 50%/50% so as to manufacture the vegetable cardboard. The cardboard is then manufactured on a paper machine at a grammage of about 275 g/m$^2$.)

5°) Cocoa Vegetable Cardboard for Secondary Wrapping (Chocolate Box)

A vegetable cardboard according to the invention comprising fibres originating from cocoa tree husks was manufactured according to the following method: the husks were ground using a knife mill so as to obtain particles about 1 mm in size. The ground husk material was then mixed with water at 70° C. for 45 minutes, in a husk/water ratio of 1/10. The mixture is then centrifuged so as to separate the aqueous part (fluid originating from the cocoa tree husks) from the insoluble part (cocoa husk fibres). The insoluble part is refined using a disc refiner. After refining, delignified fibres originating from resinous trees are added to the refined insoluble part in a delignified fibres/refined insoluble part ratio of 50%/50% so as to manufacture the vegetable cardboard. The cardboard is then manufactured on a paper machine at a grammage of about 250 g/m².

6°) Other Examples

Various examples of vegetable papers were obtained from the plant fibres and plant parts presented in the table below, the fibres of said plants being subjected to extraction with water. The process used to obtain the exemplified vegetable papers is adapted so that the amount of water-soluble extracts from the plant is less than 10% by weight of the dry matter of the vegetable paper.

| Plants | Proportion of fibres according to the invention (%) | Proportion of delignified fibres (%) | Vegetable grammage (g/m²) |
|---|---|---|---|
| Beer draff | 60 | 40 | 90 |
| Coffee | 75 | 25 | 90 |
| Coffee | 75 | 25 | 180 |
| Camomile | 90 | 10 | 66 |
| Camomile | 90 | 10 | 135 |
| Camomile | 90 | 10 | 128 |
| Tomato leaves | 90 | 10 | 84 |
| Tomato leaves | 85 | 15 | 91 |
| Ginger | 90 | 10 | 101 |
| Ginkgo | 90 | 10 | 86 |
| Grape marc | 60 | 40 | 90 |
| 50% ivy/50% maté | 90 | 10 | 80 |
| Maté | 90 | 10 | 145 |
| Rooibos | 90 | 10 | 100 |
| Black tea | 90 | 10 | 116 |
| Black tea | 90 | 10 | 118 |
| Black tea | 90 | 10 | 97.5 |
| Black tea | 90 | 10 | 100 |
| Black tea | 90 | 10 | 100 |
| Green tea | 90 | 10 | 75 |
| Green tea | 90 | 10 | 64 |
| Green tea | 90 | 10 | 67 |
| Green tea | 90 | 10 | 98 |
| Green tea | 90 | 10 | 100 |
| Green tea | 80 | 20 | 100 |
| Green tea | 98 | 2 | 100 |
| Green tea | 90 | 10 | 113 |
| Green tea | 90 | 10 | 100 |
| Green tea | 90 | 10 | 100 |
| Green tea | 100 | 0 | 100 |
| Green tea | 90 | 10 | 100 |
| Green tea | 80 | 20 | 70 |
| Green tea | 60 | 40 | 90 |
| 50% green tea/50% ivy | 85 | 15 | 51.3 |
| Cucumber stalks | 85 | 15 | 90 |

5°) Example of Designs for Face Masks

Vegetable Mask with Tea/Mint Fibres

A vegetable paper according to the invention comprising fibres originating from tea tree and peppermint was manufactured according to the following method: green tea leaves and mint were mixed in a ratio of 60%/40% with water at 70° C. for 20 minutes, in a ratio (tea+mint)/water of 1/5 by weight. The mixture then undergoes an extraction step in a hydraulic press to separate the aqueous part from the insoluble part (tea and mint fibres). The recovered insoluble part is heated a second time at 70° C. for 10 minutes with an insoluble part/water ratio of 1/5 by weight. After an additional extraction (by pressing), the sample is refined using a disc refiner. After refining, cellulose fibres (abaca) are added to the refined delignified fibres in a ratio of delignified fibres/fibres according to the invention of tea and mint of 1/1 by weight and a wet strength agent is added in a ratio of agent/total fibres of 1/9 so as to manufacture vegetable paper sheets having a grammage of about 80 g/m². The vegetable paper sheets are then dried on a hotplate.

In other examples, the abaca fibre is replaced with flax fibre and the ratio of delignified fibres/vegetable fibres according to the invention ranges from 1/9 to 1/1.

Vegetable Mask with Green Tea Fibres for Hydroentanglement

A vegetable paper according to the invention comprising fibres originating from tea tree was manufactured according to the following method: green tea leaves were mixed with water at 70° C. for 20 minutes, in a tea/water ratio of 1/5 by weight. The mixture then undergoes a step of extraction in a hydraulic press to separate the aqueous part from the insoluble part (tea fibres). The recovered insoluble part is heated a second time at 70° C. for 10 minutes with an insoluble part/water ratio of 1/5 by weight. After an additional extraction (by pressing), the sample is refined using a disc refiner. After refining, delignified abaca fibres and Tencel® 10 mm fibres are added to the fibres of the invention of tea tree and mint in an abaca/Tencel®/tea ratio of 4/1/5 so as to manufacture vegetable paper sheets. The sheet formed is then hydroentangled.

In another example, the Tencel® fibres are replaced with synthetic fibres (rayon, PET) added to the delignified abaca fibres and the fibres of the invention of tea tree in an abaca/synthetic fibres/tea ratio of 4/1/5.

Analysis Results

1) Cocoa Tree Vegetable Paper

| | Measuring method | Cocoa tree vegetable paper 60% cocoa tree fibres + 40% cellulose fibres of Example 1 |
|---|---|---|
| Grammage (g/m²) | NF Q03 019 | 53 |
| Thickness (μm) | NF Q03 017 | 191.2 |
| Flexural strength 7.5° Machine direction MD (mN) | ISO 2493-1, 2011 | 21.6 |
| Flexural strength 7.5° Cross direction CD (mN) | ISO 2493-1, 2011 | 21.6 |
| Flexural strength 15° MD (mN) | ISO 2493-1, 2011 | 36.6 |
| Flexural strength 15° CD (mN) | ISO 2493-1, 2011 | 36.6 |
| Breaking strength MD (kN/m) | ISO 1924-2 | 0.91 |
| Breaking strength CD (kN/m) | ISO 1924-2 | 0.91 |

-continued

|  | Measuring method | Cocoa tree vegetable paper 60% cocoa tree fibres + 40% cellulose fibres of Example 1 |
|---|---|---|
| Deformation before rupture MD (%) | ISO 1924-2 | 1.4 |
| Deformation before rupture CD (%) | ISO 1924-2 | 1.4 |
| Burst strength (KPa) | ISO 2758 | 47.4 |

2) Coffee Tree Vegetable Paper

|  | Measuring method | Vegetable paper 90% coffee tree fibres + 10% cellulose fibres of Example 2 | Standard paper 100% cellulose fibres |
|---|---|---|---|
| Grammage (g/m$^2$) | NF Q03 019 | 124.5 | 55 |
| Thickness (μm) | NF Q03 017 | 478.9 | 186 |
| Burst strength (kPa) | NF Q03 053 | 82.05 | 115 |

The burst strength of the coffee tree vegetable paper is of the same order of magnitude as that of the standard paper, but the grammages of the two papers are very different.

3) Green Tea Vegetable Cardboard

|  | Measuring method | Vegetable cardboard 50% tea fibres |
|---|---|---|
| Grammage (g/m$^2$) | NFQ 03-019 | 275 |
| Thickness (μm) | NFQ 03-016 | 495 |

4) Cocoa Tree Vegetable Cardboard

|  | Measuring method | Vegetable cardboard 50% cocoa fibres |
|---|---|---|
| Grammage (g/m$^2$) | NF EN ISO 536 | 254 |
| Thickness (μm) | NF EN ISO 534 | 420 |

5) Vegetable Mask with Green Tea Fibres for Hydroentanglement

|  | Measuring method | Vegetable mask Green tea fibre |
|---|---|---|
| Grammage (g/m$^2$) | NF EN ISO 536 | 79 |
| Thickness (μm) | NF EN ISO 534 | 456.00 |

The invention claimed is:

1. Vegetable paper comprising:
   fibres of a plant which has undergone extraction in a solvent wherein the solvent comprises water,
   wherein the vegetable paper contains less than 4% of water soluble plant extract by weight of dry matter of said vegetable paper,
   and wherein the extracted fibers of the plant comprise at least 50% by weight of the vegetable paper.

2. Vegetable paper according to claim 1, in which the plant is chosen from cocoa tree, coffee tree, tea tree, vine, ginger, ginkgo, camomile, tomato, ivy, maté, rooibos, cucumber, a cereal or a tree.

3. Vegetable paper according to claim 1, in which the plant is the whole plant, a plant part or a mixture of different plant parts.

4. Vegetable paper according to claim 3, in which the plant part is chosen from tea tree leaf, the husk protecting the cocoa bean, the film surrounding the coffee grain, beer draff, grape marc, cucumber stalk or tomato leaf.

5. Vegetable paper according to claim 3, in which the plant part comprises sapwood, heart wood or pith of the tree.

6. Vegetable paper according to claim 1, in which the plant is the cocoa tree and the plant part is the husk protecting the cocoa bean.

7. Vegetable paper according to claim 1, in which the plant is the coffee tree and the plant part is the film surrounding the coffee grain.

8. Vegetable paper according to claim 1, in which the plant is the tea tree and the plant part is the tea tree leaf.

9. Vegetable paper according to claim 1, said vegetable paper being a cardboard.

10. Wrapping paper comprising the vegetable paper as defined in claim 1.

11. Decorative paper comprising the vegetable paper as defined in claim 1.

12. Writing paper comprising the vegetable paper as defined in claim 1.

13. Hygiene paper comprising the vegetable paper as defined in claim 1.

14. Absorbent paper comprising the vegetable paper as defined in claim 1.

15. Cleaning wipe comprising the vegetable paper as defined in claim 1.

16. Cleaning wipe according to claim 15 for use as body care or for household maintenance.

17. Cosmetic product comprising the vegetable paper as defined in claim 1.

18. Cosmetic product according to claim 17, said cosmetic product being a face mask, a patch for the eyes or a body envelope.

19. Handkerchief comprising the vegetable paper as defined in claim 1.

20. Hybrid paper comprising the vegetable paper as defined in claim 1 and a second paper, said second paper comprising a spunbound support or being manufactured via a wet laid process, a drylaid carded process using long artificial or natural fibres, or an airlaid process using long artificial or natural fibres.

21. Papermaking process for manufacturing a vegetable paper as defined in claim 1, comprising the following steps:
   one or more plant parts are mixed with a solvent so as to extract the extract of the plant that is soluble in the solvent,
   the extract of the plant that is soluble in the solvent is then separated from the fibrous parts of the plant so as to obtain the fibres,
   the fibres are passed through a paper machine so as to manufacture the vegetable paper.

22. Process according to claim 21, in which the solvent is water and the extraction is performed at atmospheric pressure and the water temperature is from 30° C. to 100° C.

* * * * *